April 15, 1958          M. KAMINS          2,831,182
HAZARD COMPUTER DEVICE FOR MOTOR VEHICLES
Filed June 14, 1956
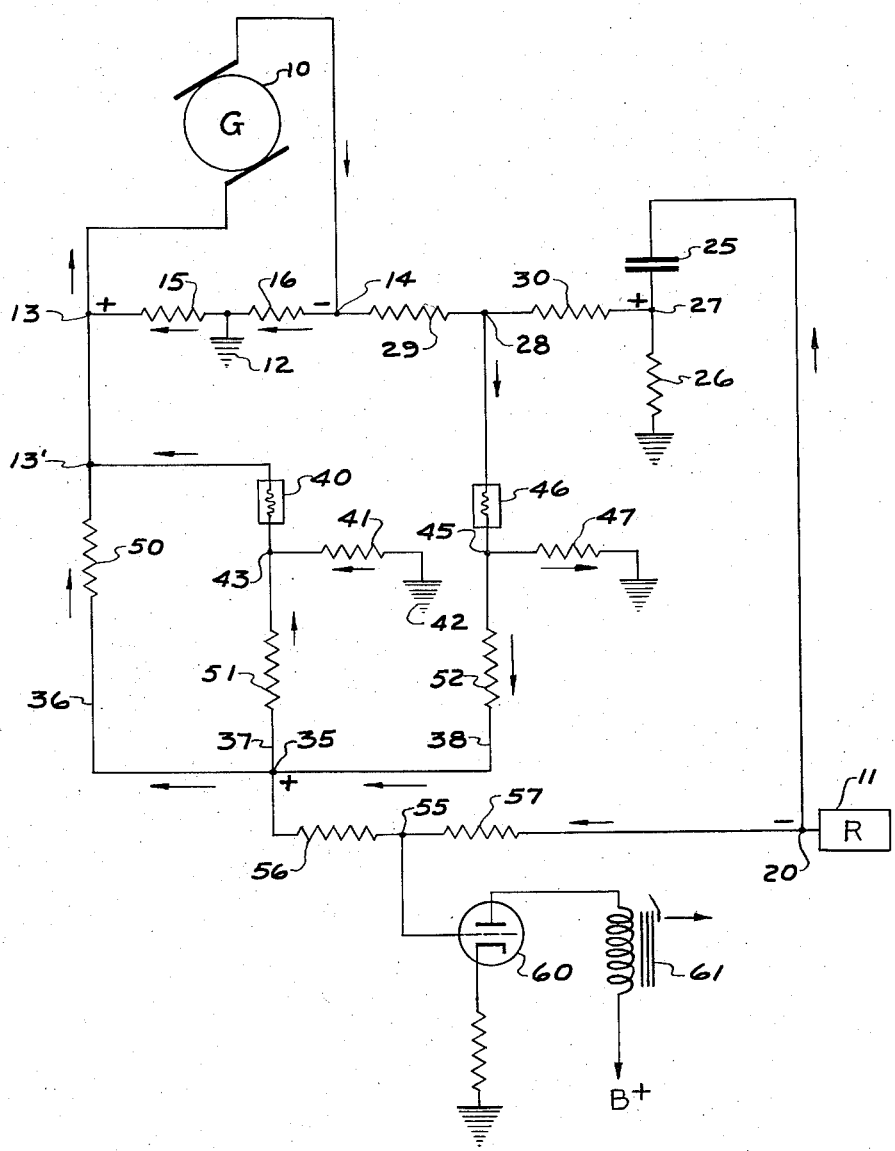
INVENTOR
Milton Kamins
BY
Wilson, Redrow & Sadler

# United States Patent Office 2,831,182
Patented Apr. 15, 1958

2,831,182
HAZARD COMPUTER DEVICE FOR MOTOR VEHICLES

Milton Kamins, South Bend, Ind., assignor to Studebaker-Packard Corporation, Detroit, Mich., a corporation of Michigan Application June 14, 1956, Serial No. 591,387

14 Claims. (Cl. 340—258)

This invention relates to a hazard computer for motor vehicles.

In the operation of motor vehicles one type of accident which occurs frequently is one in which a leading car comes to a sudden stop by decelerating rapidly and is hit by a trailing car. This type of accident occurs when the trailing car is following so closely, in view of its speed and the speed of the leading car, that the driver of the trailing car cannot stop his car in time to avoid a collision when the leading car decelerates rapidly and stops.

In general, there are two main reasons why one car follows another too closely. One reason is that the judgement of the driver of the trailing car is faulty such that he does not know that he is following too closely. The other reason is that through carelessness or lack of attention a driver of a trailing car is not aware of the fact that he is following too closely. In both of these cases the hazard of colliding with a leading car could be entirely avoided if the trailing car were equipped with a device which would automatically signal or warn the driver that he is following the car ahead of him too closely.

A main object of the present invention is to provide a new and improved automotive hazard computer device which automatically determines a minimum safe following distance and functions to actuate a device such as a warning signal or the brakes of the trailing vehicle when the trailing vehicle is following a leading vehicle too closely.

Other objects of the invention will become apparent from the following specification, the drawing relating thereto, and the appended claims.

In the drawing there is shown a schematic diagram of an automotive hazard computer device embodying the present invention.

The hazard computer device of the present invention is adapted to be installed in a vehicle which is referred to herein as the subject or trailing vehicle as distinguished from an object or leading vehicle.

The present inventor has found that the minimum safe distance which a trailing vehicle should be behind a leading vehicle to avoid a collision, in the event that the driver of the leading car should apply maximum braking deceleration, may be expressed by the following relationship:

$$s = vt + kv^n - k(v - \Delta v)^n$$

in which:

$s$ = minimum safe following distance (feet).
$v$ = speed of subject car (feet/second).
$t$ = driver reaction time (seconds).
$k$ = a braking coefficient.
$\Delta v$ = rate of closure between subject car and object car (ft./sec.²).
$n$ = an exponent between 2.1 and 2.3.

The three terms which are added algebraically to indicate the safe following distance for the trailing vehicle are as follows:

$vt$ = number of feet subject vehicle travels during driver's reaction time.
$kv^n$ = number of feet subject vehicle travels during braking time.
$k(v - \Delta v)^n$ = number of feet object or leading vehicle travels during braking time.

In accordance with the present invention there is provided an electrical hazard computer device which continuously computes the minimum safe following distance $s$ and, at one point in the circuit thereof, continuously yields a voltage which is proportional to the minimum safe following distance. The hazard computer device also functions to continuously determine the actual distance between the subject vehicle and a leading vehicle (or a stationary object) and, at one point in the circuit, yields a voltage which is proportional to the actual separating distance. The hazard computer device further functions to continuously compare the two voltages corresponding to (1) the minimum safe following distance and (2) the actual separating distance and functions to actuate a device, such as a warning signal or the brakes of the subject vehicle, when the ratio of the compared voltages is reduced to a value at which distances (1) and (2) are equal.

Referring to the drawing there is illustrated means for continuously generating a voltage which is directly proportional to the velocity or speed of the subject vehicle and which is illustrated herein as a generator 10. Generator 10 may be driven by any suitable part of the vehicle such as the propeller shaft. Other ways or means for continuously creating a voltage which is proportional to the speed of the vehicle may also be utilized within the scope of the invention.

Means is provided for continuously generating a voltage proportional to the distance between the subject vehicle and a leading vehicle which is illustrated herein as a radar range indicator 11. Other ways or means for continuously creating a voltage which is proportional to the distance between the subject vehicle and a leading vehicle may also be utilized within the scope of the invention.

Generator 10 is provided with suitable commutator means and is disposed in the circuit with respect to a ground 12 such that there is a positive voltage at junction 13 and a negative voltage at junction 14. Resistances 15 and 16 are equal and their values are selected relative to the rating of generator 10 such that currents on the order of one ampere flow in this portion of the circuit.

The voltages at junctions 13 and 14 are always equal in magnitude and vary continuously in accordance with the speed of the subject vehicle. The voltages at junctions 13 and 14 may vary between 0 and 10 volts, for example, to correspond to speeds of the subject vehicle between 0 and 100 miles per hour or 0 to 146.7 feet per second.

Range indicator 11 continuously maintains a negative voltage at junction 20 which is proportional to the distance between the subject vehicle and a leading vehicle. By way of example the magnitude of this voltage may be on the order of 100 volts when the separating distance between the vehicles is 1000 feet.

A voltage which is proportional to $\Delta v$, which is the rate of closure between the subject vehicle and a leading vehicle, is continuously obtained by providing differentiating means for differentiating the range voltage established at junction 20. The differentiating means is illustrated herein as an R–C differentiating network having a capacitor 25 and a resistor 26. A differentiated voltage which is proportional to $\Delta v$ is established at junction 27. During closing conditions when the separating distance between the subject car and a leading car is decreasing, the voltage at junction 20 also decreases and an increasing positive differentiated voltage appears at junction 27. The differentiated voltage at junction 27 is proportional to the closure rate which is the rate at which the subject vehicle is catching up to a leading vehicle. The differentiated voltage at junction 27 need not necessarily be of the same order as the velocity voltage at junction 14.

It is desired that the voltage at junction 28 be proportional to the term $(v-\Delta v)$ which is the absolute speed of the leading vehicle and is the difference between the velocity of the subject vehicle, which is represented by the negative voltage at junction 14, and the closure rate between the vehicles which is represented by the positive differentiated voltage at junction 27. If the voltages at junctions 14 and 27 are not of the same order, resistances 29 and 30 are provided so as to have a ratio which causes the voltage at junction 28 to be of the same order as the voltage at junction 14.

The voltage at a junction 35 is continuously proportional to the minimum safe distance which should separate the subject vehicle from a leading vehicle and is the result of a summing operation. The three terms $vt$, $kv^n$, and $k(v-\Delta v)^n$ which can be summed to equal the minimum safe distance are represented in the circuit although they cannot be individually identified. The three legs 36, 37 and 38 of the circuit are utilized in this summing operation.

The voltage at junction 13', which is the same as the voltage at junction 13, is proportional to the velocity $v$ of the subject vehicle. To obtain the term $v^n$ there is provided means for raising the term $v$ to a power which is illustrated herein as a thyrite resistor 40. Thyrite is made by pressing silicon carbide with a suitable ceramic binder at high pressure followed by a firing operation at high temperature. Thyrite is a nonlinear resistor in which the current varies as a power of the applied voltage in accordance with the expression $I=KE^n$. Thyrite has a relatively high resistance such the value of K in this expression is on the order of .00004. The value of the exponent in this expression varies for different samples of thyrite from about 2.49 to 3.36.

To reduce the exponent in the expression $I=KE^n$ it is necessary to place a linear resistance in series with the thyrite resistor 40. In the illustrated embodiment of the invention a resistance 41 is provided in series with the thyrite resistor 40 and is grounded at 42. The resistance 41 is of a value which causes the current flowing to junction 13' from junction 43 to vary with respect to the voltage at junction 13' in accordance with a predetermined power such as 2.2 for example. As the current flowing through resistance 41 varies exponentially with respect to the voltage at junction 13', the voltage drop across resistance 41 varies exponentially to the same degree with respect to the voltage at junction 13'. Hence the voltage at junction 43 also varies exponentially to the same degree with respect to the voltage at junction 13'.

It was stated above that the thyrite resistor 40 has a relatively high resistance and accordingly the actual magnitude of the voltage at junction 43 is relatively low and may only be on the order of from about one to ten percent of the voltage at junction 13' for example.

In a similar manner a voltage is obtained at junction 45 in leg 38 which varies exponentially with respect to the voltage at junction 28 in accordance with any predetermined power such as 2.2 for example. To facilitate this a thyrite resistor 46 and a resistance 47 in series therewith are provided. The voltage at junction 45 may be considerably less in actual magnitude than the voltage at junction 28, however, and may actually be only on the order of from about one to ten percent of the voltage at junction 28.

With the above described arrangement established, the manner in which a voltage is obtained at junction 35 which is proportional to the minimum safe following distance for the subject vehicle relative to a leading vehicle can now be explained. The relationship by which the minimum safe following distance is expressed is $s=vt+kv^n-k(v-\Delta v)^n$. In this relationship the braking coefficient $k$ is given a value of about .025 within the scope of the invention. The driver reaction time $t$ is given a value of one second. The exponent $n$ has a value between 2.1 and 2.3 and may be 2.2 for example.

The above constants for $k$, $t$ and $n$ are referred to only by way of example and are not to be considered as limiting with respect to the novel broader aspects of the invention. With the constants as selected above the relationship for a particular installation may be as follows:

$$s=v+.025\ v^{2.2}-.025\ (v-\Delta v)^{2.2}$$

It is assumed for the purpose of illustration that, due to the relative high resistances of the thyrite resistors 40 and 46, the magnitude of the voltages at junctions 43 and 45 are respectively about one to ten percent of the voltages at junctions 13' and 28. With this assumption a voltage $e$ at junctions 13' or 28 would equal $.01e^{2.2}$ at junctions 43 or 45.

The electron flow in the legs 36, 37 and 38 of the circuit are as indicated in the drawing. Neglecting leg 38 for the moment, a voltage may be obtained at junction 35 which is proportional to $v+.025v^{2.2}$ by selecting a suitable ratio for resistances 50 and 51 in legs 36 and 37. In this example the ratio of the resistances 50 to 51 would be 2½ to 1. Resistors 50 and 51 are large relative to the resistance of the thyrite resistor 40 such that the electron flow through resistors 50 and 51 is small compared to the electron flow through the thyrite resistor 40 and has no appreciable effect on the establishing of the voltage at junction 43. In general an electron flow on the order of 10 mils through thyrite resistor 40 and 0.1 mil through resistor 51 gives satisfactory results.

A voltage at junction 35 proportional to the expression $s=v+.025v^{2.2}-.025\ (v-\Delta v)^{2.2}$, which is the minimum safe following distance in this example, is obtained by providing the leg 38 of the circuit with a resistance 52 which is equal to the resistance 51 in leg 37. This voltage at junction 35 of course only applies for this example where the driver's reaction time $t$ is 1 second, the braking coefficient $k$ is .025, and the braking exponent $n$ is 2.2.

The voltage at junction 35, which is proportional to the minimum safe following distance, can now be compared with the voltage at junction 20 which is proportional to the actual distance separating the subject vehicle and a leading vehicle. The voltages are compared at a junction 55 and the ratio of resistors 56 and 57 are selected so that the voltage at junction 55 is maintained at a negative potential as the voltage varies at that point. A D-C amplifier 60 is provided having the grid thereof connected to junction 55. The load for the amplifier circuit is a relay 61 which is actuated when the current in the amplifier circuit reaches a predetermined value. Relay 61 is adjusted to be actuated when the voltage at junction 55 is at a value at which the minimum safe following distance, which is indicated by the voltage at junction 35, equals the actual distance separating the subject vehicle and a leading vehicle, which is indicated by the voltage at junction 20. The voltages at junctions 35 and 20 need not be of the same order in that the ratio of the resistors 56 and 57 is selected to equalize the effects these voltages have at the junction 55.

Relay 61 may be adapted to cause actuation of another device (not shown) such as a warning buzzer or light or the brakes of the subject vehicle. Thus, when the subject vehicle is following a leading vehicle too closely the driver of the subject vehicle is either warned of this by a light or buzzer, or the brakes of his vehicle are automatically applied, until a safe following distance is established.

The above described hazard computer device can be made adjustable in various ways to provide for a greater or lesser driver reaction time and for varying weather conditions. Resistor 50 can be made variable to adjust for different driver reaction times, for example. Resistors 41 and 47 can be made adjustable, preferably with a gang connection, to adjust for varying weather conditions. These adjustments are effective to cause the voltages at junction 35 to indicate different distances as being the minimum safe following distance.

In various parts of the above description, voltages at two junctions are referred to as not being of the same order. This means, by way of example, that at one junction 1 volt might indicate 1 ft./sec. whereas at another junction 1 volt might indicate 10 ft./sec. Suitable resistances are utilized throughout the circuit to compensate or adjust for this difference in the order of the voltages at different junctions.

The invention may be embodied in other specific forms without departing from the spirit or essential characteristics thereof. The present embodiment of the invention is therefore to be considered in all respects as illustrative and not restrictive, the scope of the invention being indicated by the appended claims rather than by the foregoing description, and all changes which come within the meaning and range of equivalency of the claims are therefore intended to be embraced therein.

It is claimed and desired to secure by Letters Patent:

1. A hazard computer for a subject vehicle comprising means for continuously generating a first velocity voltage proportional to the velocity of said subject vehicle, a range indicator for continuously generating a range voltage proportional to the distance between said subject vehicle and a leading vehicle, means for obtaining a composite voltage proportional to the minimum safe following distance for said subject vehicle, and means for comparing said composite voltage and said range voltage to obtain a predetermined signal voltage when the minimum safe following distance for said subject vehicle equals the distance separating said subject vehicle and a leading vehicle.

2. A hazard computer for a subject vehicle comprising means for continuously generating a first velocity voltage proportional to the velocity of said subject vehicle, a range indicator for continuously generating a range voltage proportional to the distance between said subject vehicle and a leading vehicle, means for differentiating said range voltage to obtain a closure voltage proportional to the rate of closure between said vehicles, means for obtaining a composite voltage proportional to the minimum safe following distance for said subject vehicle, and means for comparing said composite voltage and said range voltage to obtain a predetermined signal voltage when the minimum safe following distance for said subject vehicle equals the distance separating said subject vehicle and a leading vehicle.

3. A hazard computer for a subject vehicle comprising means for continuously generating a first velocity voltage proportional to the velocity of said subject vehicle, a range indicator for continuously generating a range voltage proportional to the distance between said subject vehicle and a leading vehicle, means for differentiating said range voltage to obtain a closure voltage proportional to the rate of closure between said vehicles, means for subtracting said closure voltage from said first velocity voltage to obtain a second velocity voltage proportional to the velocity of said leading vehicle, means for obtaining a composite voltage proportional to the minimum safe following distance for said subject vehicle, and means for comparing said composite voltage and said range voltage to obtain a predetermined signal voltage when the minimum safe following distance for said subject vehicle equals the distance separating said subject vehicle and a leading vehicle.

4. A hazard computer for a subject vehicle comprising means for continuously generating a first velocity voltage proportional to the velocity of said subject vehicle, a range indicator for continuously generating a range voltage proportional to the distance between said subject vehicle and a leading vehicle, means for differentiating said range voltage to obtain a closure voltage proportional to the rate of closure between said vehicles, means for subtracting said closure voltage from said first velocity voltage to obtain a second velocity voltage proportional to the velocity of said leading vehicle, means for obtaining a first exponential voltage proportional to a predetermined power of said first velocity voltage, means for obtaining a second exponential voltage proportional to a predetermined power of said second velocity voltage, means for summing said first velocity voltage and said first and second exponential voltages to obtain a composite voltage proportional to the minimum safe following distance, and means for comparing said composite voltage and said range voltage to obtain a predetermined signal voltage when the minimum safe following distance for said subject vehicle equals the distance separating said subject vehicle and a leading vehicle.

5. A hazard computer for a subject vehicle comprising means for continuously generating a first velocity voltage proportional to the velocity of said subject vehicle, a range indicator for continuously generating a range voltage proportional to the distance between said subject vehicle and a leading vehicle, means for differentiating said range voltage to obtain a closure voltage proportional to the rate of closure between said vehicles, means for subtracting said closure voltage from said first velocity voltage to obtain a second velocity voltage proportional to the velocity of said leading vehicle, means including a nonlinear resistance element for obtaining a first exponential voltage proportional to a predetermined power of said first velocity voltage, means including a nonlinear resistance element for obtaining a second exponential voltage proportional to a predetermined power of said second velocity voltage, means for summing said first velocity voltage and said first and second exponential voltages to obtain a composite voltage proportional to the minimum safe following distance, and means for comparing said composite voltage and said range voltage to obtain a predetermined signal voltage when the minimum safe following distance for said subject vehicle equals the distance separating said subject vehicle and a leading vehicle.

6. A hazard computer for a subject vehicle comprising means for continuously generating a first velocity voltage proportional to the velocity of said subject vehicle, a range indicator for continuously generating a range voltage proportional to the distance between said subject vehicle and a leading vehicle, means for differentiating said range voltage to obtain a closure voltage proportional to the rate of closure between said vehicles, means for subtracting said closure voltage from said first velocity voltage to obtain a second velocity voltage proportional to the velocity of said leading vehicle, means including a thyrite resistor for obtaining a first exponential voltage proportional to a predetermined power of said first velocity voltage, means including a thyrite resistor for obtaining a second exponential voltage proportional to a predetermined power of said second velocity voltage, means for summing said first velocity voltage and said first and second exponential voltages to obtain a composite voltage proportional to the minimum safe following distance, and means for comparing said composite voltage and said range voltage to obtain a predetermined signal voltage when the minimum safe following distance for said subject vehicle equals the distance separating said subject vehicle and a leading vehicle.

7. A hazard computer for a subject vehicle comprising means for continuously generating a first velocity voltage proportional to the velocity of said subject vehicle, a range indicator for continuously generating a range voltage proportional to the distance between said subject vehicle and a leading vehicle, means for differentiating said range voltage to obtain a closure voltage proportional to the rate of closure between said vehicles, means for subtracting said closure voltage from said first velocity voltage to obtain a second velocity voltage proportional to the velocity of said leading vehicle, means for obtaining a first exponential voltage proportional to said first velocity voltage to a power between 2.1 and 2.3, means for obtaining a second exponential voltage proportional to said second velocity voltage to a power between 2.1 and 2.3, means for summing said first velocity voltage and said first and second exponential voltages to obtain a composite voltage proportional to the minimum safe following distance, and means for comparing said composite voltage and said range voltage to obtain a predetermined signal voltage when the minimum safe following distance for said subject vehicle equals the distance separating said subject vehicle and a leading vehicle.

8. A hazard computer for a subject vehicle comprising means for continuously generating a first velocity voltage proportional to the velocity of said subject vehicle, a range indicator for continuously generating a range voltage proportional to the distance between said subject vehicle and a leading vehicle, means for differentiating said range voltage to obtain a closure voltage proportional to the rate of closure between said vehicles, means for subtracting said closure voltage from said first velocity voltage to obtain a second velocity voltage proportional to the velocity of said leading vehicle, means for obtaining a first exponential voltage proportional to said first velocity voltage to a power of 2.2, means for obtaining a second exponential voltage proportional to said second velocity voltage to a power of 2.2, means for summing said first velocity voltage and said first and second exponential voltages to obtain a composite voltage proportional to the minimum safe following distance, and means for comparing said composite voltage and said range voltage to obtain a predetermined signal voltage when the minimum safe following distance for said subject vehicle equals the distance separating said subject vehicle and a leading vehicle.

9. A hazard computer for a subject vehicle comprising means for continuously generating a first velocity voltage proportional to the velocity of said subject vehicle, a range indicator for continuously generating a range voltage proportional to the distance between said subject vehicle and a leading vehicle, means for differentiating said range voltage to obtain a closure voltage proportional to the rate of closure between said vehicles, means for subtracting said closure voltage from said first velocity voltage to obtain a second velocity voltage proportional to the velocity of said leading vehicle, means for obtaining a first exponential voltage proportional to a predetermined power of said first velocity voltage, means for obtaining a second exponential voltage proportional to a predetermined power of said second velocity voltage, means for summing (1) said first velocity voltage times a constant corresponding to driver reaction time, plus (2) said first exponential voltage times a braking coefficient to obtain a composite voltage proportional to the minimum safe following distance, and means for comparing said composite voltage and said range voltage to obtain a predetermined signal voltage when the minimum safe following distance for said subject vehicle equals the distance separating said subject vehicle and a leading vehicle.

10. A hazard computer for a subject vehicle comprising means for continuously generating a first velocity voltage proportional to the velocity of said subject vehicle, a range indicator for continuously generating a range voltage proportional to the distance between said subject vehicle and a leading vehicle, means for differentiating said range voltage to obtain a closure voltage proportional to the rate of closure between said vehicles, means for subtracting said closure voltage from said first velocity voltage to obtain a second velocity voltage proportional to the velocity of said leading vehicle, means for obtaining a first exponential voltage proportional to a predetermined power of said first velocity voltage, means for obtaining a second exponential voltage proportional to a predetermined power of said second velocity voltage, circuit summing means for summing (1) said first velocity voltage times a constant corresponding to driver reaction time, plus (2) said first exponential voltage times a braking coefficient, minus (3) said second exponential voltage times a braking coefficient to obtain a composite voltage proportional to the minimum safe following distance, said circuit summing means including resistance means for controlling the contributions of said first velocity voltage and said first and second exponential voltages to said composite voltage in accordance with the actual conditions they represent, and means for comparing said composite voltage and said range voltage to obtain a predetermined signal voltage when the minimum safe following distance for said subject vehicle equals the distance separating said subject vehicle and a leading vehicle.

11. A hazard computer for a subject vehicle comprising means for continuously generating a first velocity voltage proportional to the velocity of said subject vehicle, a range indicator for continuously generating a range voltage proportional to the distance between said subject vehicle and a leading vehicle, means for differentiating said range voltage to obtain a closure voltage proportional to the rate of closure between said vehicles, means for subtracting said closure voltage from said first velocity voltage to obtain a second velocity voltage proportional to the velocity of said leading vehicle, means including a nonlinear resistance element for obtaining a first exponential voltage proportional to a predetermined power of said first velocity voltage, means including a nonlinear resistance element for obtaining a second exponential voltage proportional to a predetermined power of said second velocity voltage, means for summing (1) said first velocity voltage times a constant corresponding to driver reaction time, plus (2) said first exponential voltage times a braking coefficient, minus (3) said second exponential voltage times a braking coefficient to obtain a composite voltage proportional to the minimum safe following distance, and means for comparing said composite voltage and said range voltage to obtain a predetermined signal voltage when the minimum safe following distance for said subject vehicle equals the distance separating said subject vehicle and a leading vehicle.

12. A hazard computer for a subject vehicle comprising means for continuously generating a first velocity voltage proportional to the velocity of said subject vehicle, a range indicator for continuously generating a range voltage proportional to the distance between said subject vehicle and a leading vehicle, means for differentiating said range voltage to obtain a closure voltage proportional to the rate of closure between said vehicles, means for subtracting said closure voltage from said first velocity voltage to obtain a second velocity voltage proportional to the velocity of said leading vehicle, means including a thyrite resistor for obtaining a first exponential voltage proportional to a predetermined power of said first velocity voltage, means including a thyrite resistor for obtaining a second exponential voltage proportional to a predetermined power of said second velocity voltage, means for summing (1) said first velocity voltage times a constant corresponding to driver reaction time, plus (2) said first exponential voltage times a braking coefficient, minus (3) said second exponential voltage times a braking coefficient to obtain a composite voltage proportional to the minimum safe following distance, and means for comparing said composite voltage and said range voltage to obtain a predetermined signal voltage when the minimum safe following distance for said subject vehicle equals the distance separating said subject vehicle and a leading vehicle.

13. A hazard computer for a subject vehicle comprising means for continuously generating a first velocity voltage proportional to the velocity of said subject vehicle, a range indicator for continuously generating a range voltage proportional to the distance between said subject vehicle and a leading vehicle, means for differentiating said range voltage to obtain a closure voltage proportional to the rate of closure between said vehicles, means for subtracting said closure voltage from said first velocity voltage to obtain a second velocity voltage proportional to the velocity of said leading vehicle, means for obtaining a first exponential voltage proportional to said first velocity voltage to a power between 2.1 and 2.3, means for obtaining a second exponential voltage to a power between 2.1 and 2.3, means for summing (1) said first velocity voltage times a constant corresponding to driver reaction time, plus (2) said first exponential voltage times a braking coefficient, minus (3) said second exponential voltage times a braking coefficient to obtain a composite voltage proportional to the minimum safe following distance, and means for comparing said composite voltage and said range voltage to obtain a predetermined signal voltage when the minimum safe following distance for said subject vehicle equals the distance separating said subject vehicle and a leading vehicle.

14. A hazard computer for a subject vehicle comprising means for continuously generating a first velocity voltage proportional to the velocity of said subject vehicle, a range indicator for continuously generating a range voltage proportional to the distance between said subject vehicle and a leading vehicle, means for differentiating said range voltage to obtain a closure voltage proportional to the rate of closure between said vehicles, means for subtracting said closure voltage from said first velocity voltage to obtain a second velocity voltage proportional to the velocity of said leading vehicle, means for obtaining a first exponential voltage proportional to said first velocity voltage to a power of 2.2, means for obtaining a second exponential voltage proportional to said second velocity voltage to a power of 2.2, means for summing (1) said first velocity voltage times a constant corresponding to driver reaction time, plus (2) said first exponential voltage times a braking coefficient of .025, minus (3) said second exponential voltage times a braking coefficient of .025 to obtain a composite voltage proportional to the minimum safe following distance, and means for comparing said composite voltage and said range voltage to obtain a predetermined signal voltage when the minimum safe following distance for said subject vehicle equals the distance separating said subject vehicle and a leading vehicle.

References Cited in the file of this patent
UNITED STATES PATENTS

| | | |
|---|---|---|
| 2,702,342 | Korman | Feb. 15, 1955 |
| 2,762,913 | Jepson | Sept. 11, 1956 |